(12) United States Patent
Huang

(10) Patent No.: US 12,473,929 B1
(45) Date of Patent: Nov. 18, 2025

(54) PORTABLE FAN

(71) Applicant: Di Huang, Shenzhen (CN)

(72) Inventor: Di Huang, Shenzhen (CN)

( * ) Notice: Subject to any disclaimer, the term of this patent is extended or adjusted under 35 U.S.C. 154(b) by 0 days.

(21) Appl. No.: 18/890,104

(22) Filed: Sep. 19, 2024

(51) Int. Cl.
*F04D 29/52* (2006.01)
*F04D 19/00* (2006.01)
*F04D 25/06* (2006.01)

(52) U.S. Cl.
CPC ......... *F04D 29/522* (2013.01); *F04D 19/002* (2013.01); *F04D 25/06* (2013.01)

(58) Field of Classification Search
CPC .......... F04F 5/16; F04D 25/08; F04D 29/703; H02K 1/165; H02K 17/30; H02K 3/12; H02K 5/00; H02K 5/06; H02K 5/08; H02K 5/15; H02K 5/20; H02K 5/225
See application file for complete search history.

(56) References Cited

U.S. PATENT DOCUMENTS

| | | | | |
|---|---|---|---|---|
| 7,530,783 B1 * | 5/2009 | Ediger | .................. | F04D 29/703 |
| | | | | 415/214.1 |
| 11,629,732 B1 * | 4/2023 | Zhu | ........................ | F04D 25/08 |
| | | | | 248/689 |
| 2021/0079931 A1 * | 3/2021 | Hu | ........................ | F04D 25/084 |

FOREIGN PATENT DOCUMENTS

CN 217684252 U * 10/2022

OTHER PUBLICATIONS

English Translation CN-217684252-U (Year: 2022).*

* cited by examiner

*Primary Examiner* — Shafiq Mian
(74) *Attorney, Agent, or Firm* — Nitin Kaushik

(57) ABSTRACT

A fan that is convenient for storage includes protective outer shell, protective inner shell, base, device shell, control board, switch, power motor, and fan blades. During use, pressing switch at the center of the back of device shell causes control board to control operation of power motor, which drives fan blades to rotate. The wind generated by the rotation of fan blades blows through the hollowed-out shapes of protective outer shell and protective inner shell towards the user. The protective outer shell and protective inner shell protect the user. After use, pressing switch at the back of device shell stops power motor, causing the fan to cease operation. At this point, base is rotated in the direction of device shell until base is parallel to device shell.

4 Claims, 3 Drawing Sheets

PORTABLE FAN

TECHNICAL FIELD

The present disclosure relates to the field of fans, particularly to a fan that is convenient for storage.

BACKGROUND

To facilitate carrying and use, existing fans include small fans for ease of transport, storage, and use by individuals. Small fans require a base to support the fan body during operation. However, when carrying the fan, the base increases the overall volume, which affects the ease of transport and storage for the user.

SUMMARY

The purpose of this present disclosure is to address the issues presented in the background technology by designing a fan that is convenient for storage.

To achieve the above purpose, the technical solution of the present disclosure is a fan convenient for storage, comprising a protective outer shell, a protective inner shell, a base, a device shell, a control board, a switch, a power motor, and fan blades. The protective outer shell is embedded on the inner side of the front of the protective inner shell. The base is located below the protective inner shell and is rotatably connected to the bottom of the protective inner shell. The device shell is located at the back of the protective inner shell and is fixedly connected to the protective inner shell. The control board is located at the central position inside the device shell and is fixedly connected to the device shell. The switch is located at the central position on the back of the device shell and is electrically connected to the control board. The power motor is located inside the protective inner shell and is fixedly connected to the protective inner shell. The fan blades are located inside the protective inner shell and are fixedly connected to the output end of the power motor. The power motor is electrically connected to the control board.

In an embodiment of the present disclosure, the base is provided with a support plate. The support plate is slidably connected to the base. The support plate is provided with a spring, which is located inside the support plate and is fixedly connected to the support plate. The support plate is also provided with a clamping block, which is located inside the support plate and is slidably connected to the support plate. The clamping block is fixedly connected to the spring.

In an embodiment of the present disclosure, the protective inner shell and the protective outer shell are in the shape of a hollow hood structure.

In an embodiment of the present disclosure, the position of the switch corresponds to the position of the control board.

In an embodiment of the present disclosure, the bottom of the base is provided with a non-slip pad, which is fixedly connected to the bottom of the base.

This present disclosure provides a fan that is convenient for storage and has the following beneficial effects: Through its structural design, the device uses a switch to control the control board. When the fan needs to be turned on, pressing the switch at the center of the back of the device shell causes the control board to control the operation of the power motor, which drives the fan blades to rotate. The wind generated by the rotation of the fan blades, located between the protective outer shell and the protective inner shell, blows through the hollow shapes of the protective outer shell and the protective inner shell towards the user. The protective outer shell and the protective inner shell protect the user from injury by preventing accidental contact with the rotating fan blades. After use, pressing the switch at the back of the device shell stops the power motor, causing the fan to cease operation. At this point, the base is rotated in the direction of the device shell until the base is parallel to the device shell, thereby reducing the storage volume of the fan and making it convenient for the user to carry and store.

Figure 1:
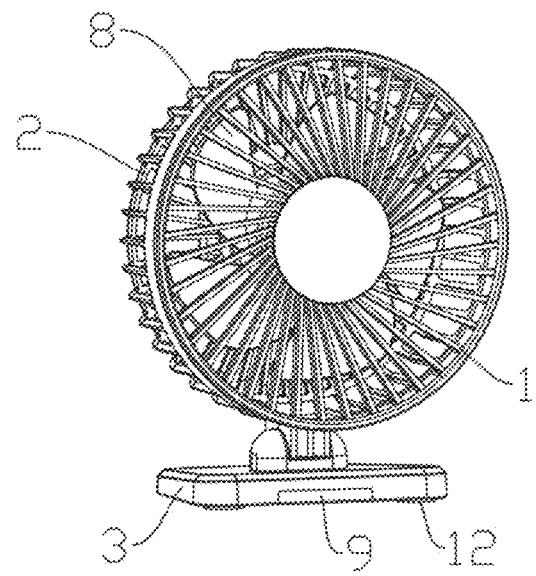
FIG. 1 is a front structural schematic diagram of the fan that is convenient for storage, as described in this present disclosure.

Reference number in the drawings: 1) Protective outer shell: 2) Protective inner shell; 3) Base: 4) Device shell: 5) Control board: 6) Switch: 7) Power motor; 8) Fan blades; 9) Support plate: 10) Spring: 11) Clamping block: 12) Non-slip pad.

DETAILED DESCRIPTION

Below, the technical solutions in the embodiments of the present disclosure will be clearly and completely described in conjunction with the accompanying drawings in the embodiments of the present disclosure. It is evident that the described embodiments are merely some, rather than all, of the embodiments of the present disclosure. Based on the embodiments of the present disclosure, all other embodiments obtained by those of ordinary skill in the art without creative efforts fall within the scope of protection of the present disclosure.

In the description of the present disclosure, it should be noted that terms such as "upper/lower end," "inner," "outer," "front end," "rear end," "both ends," "one end," "the other end," etc., indicating directions or positional relationships, are based on the directions or positional relationships shown in the accompanying drawings. They are merely for the convenience of describing the present disclosure and simplifying the description, and do not indicate or imply that the referenced devices or elements must have specific orientations, be constructed, or operate in specific orientations. Therefore, they should not be understood as limiting the present disclosure. Furthermore, terms like "first" and "second" are used for descriptive purposes only and should not be understood as indicating or implying relative importance.

In the description of the present disclosure, it should be noted that, unless otherwise explicitly specified and defined, terms such as "installation," "set up," "sleeve," "connection," etc., should be understood in a broad sense. For example, "connection" can be a fixed connection, a detachable connection, or an integral connection; it can be a mechanical connection or an electrical connection; it can be a direct connection or an indirect connection through an intermediary, and it can be an internal connection between two elements. For those skilled in the art, the specific meanings of the above terms in the present disclosure can be understood based on specific situations.

Figure 2:
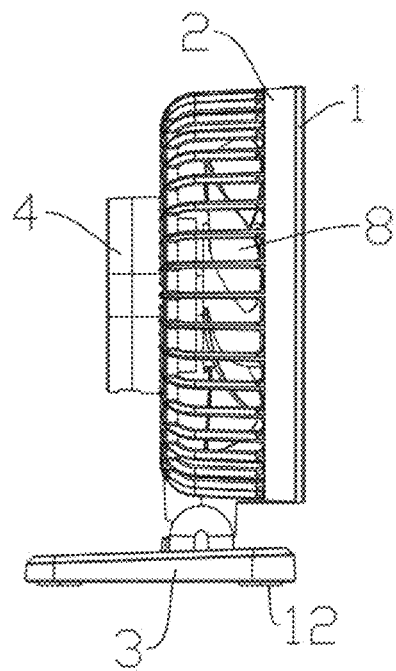
FIG. 2 is a side structural schematic diagram of the fan that is convenient for storage, as described in this present disclosure.
Figure 3:
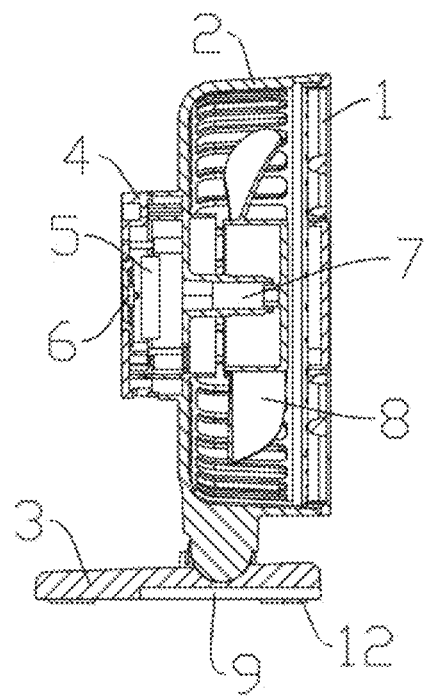
FIG. 3 is a side cross-sectional view of the fan that is convenient for storage, as described in this present disclosure.
Figure 4:
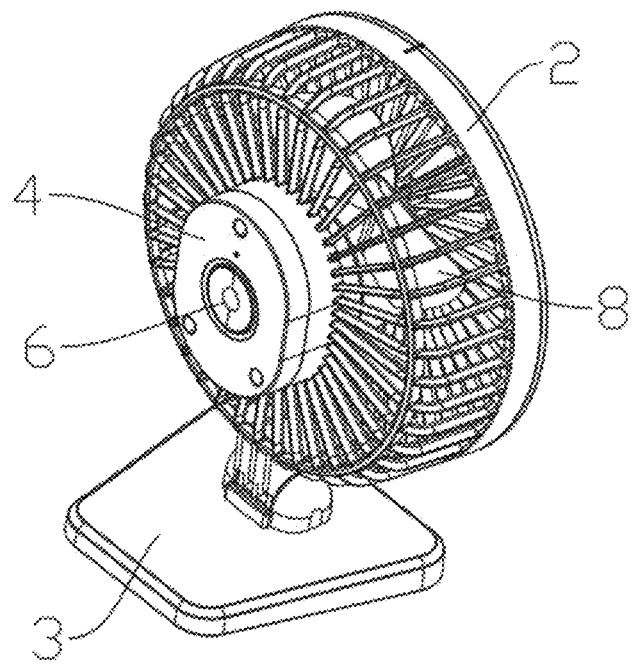
FIG. 4 is a rear structural schematic diagram of the fan that is convenient for storage, as described in this present disclosure.
Figure 5:
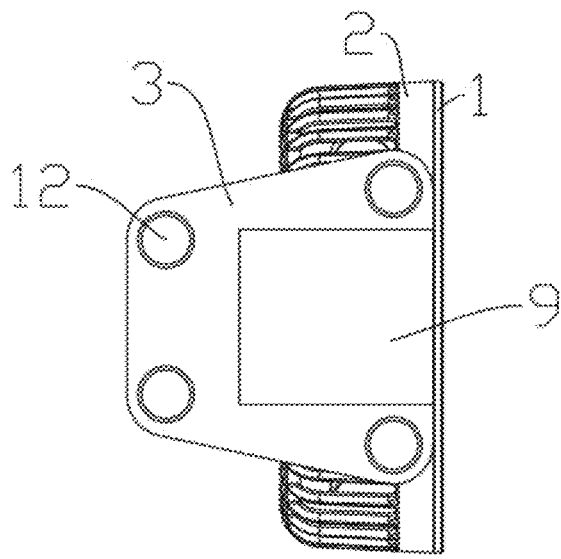
FIG. 5 is a bottom structural schematic diagram of the fan that is convenient for storage, as described in this present disclosure.
Figure 6:
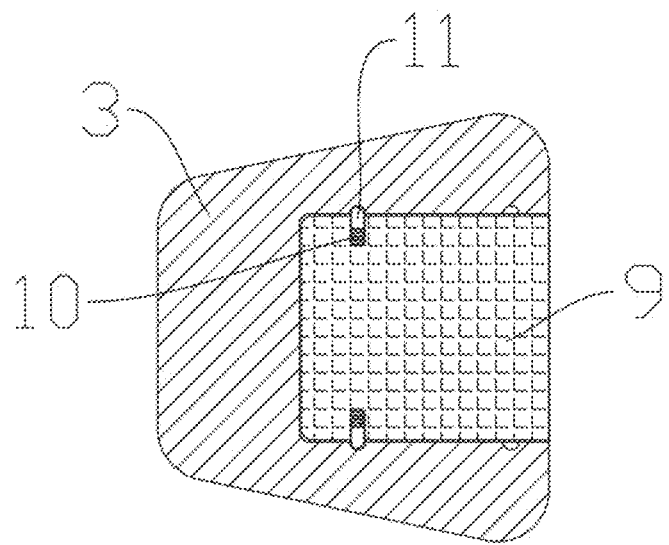
FIG. 6 is an internal structural schematic diagram of the base of the fan that is convenient for storage, as described in this present disclosure.

Please refer to FIGS. 1-6. The present disclosure provides a technical solution: a fan that is convenient for storage, comprising a protective outer shell 1, a protective inner shell 2, a base 3, a device shell 4, a control board 5, a switch 6, a power motor 7, and fan blades 8. The protective outer shell 1 is embedded on the inner side of the front of the protective inner shell 2. The base 3 is located below the protective inner shell 2 and is rotatably connected to the bottom of the protective inner shell 2. The device shell 4 is located at the back of the protective inner shell 2 and is fixedly connected to the protective inner shell 2. The control board 5 is located at the central position inside the device shell 4 and is fixedly connected to the device shell 4. The switch 6 is located at the central position on the back of the device shell 4 and is electrically connected to the control board 5. The power motor 7 is located inside the protective inner shell 2 and is fixedly connected to the protective inner shell 2. The fan blades 8 are located inside the protective inner shell 2 and are fixedly connected to the output end of the power motor 7. The power motor 7 is electrically connected to the control board 5.

In the present disclosure, the base 3 is provided with a support plate 9. The support plate 9 is slidably connected to the base 3. A spring 10 is located inside the support plate 9 and is fixedly connected to it. Additionally, a clamping block 11 is positioned inside the support plate 9 and is slidably connected to it. The clamping block 11 is fixedly connected to the spring 10. When the user operates the fan, the support plate 9 under the base 3 is pulled outward. As the support plate 9 is pulled outward, the clamping block 11 inside the support plate 9 moves inward. When the support plate 9 is pulled out to a certain distance, the spring 10 pushes the clamping block 11 into contact with a groove on the base 3, slightly limiting the movement of the support plate 9 to prevent it from sliding freely. This increases the contact area of the fan with the ground, making it more stable during use. For storage, the support plate 9 can be pushed back into the base 3 to reset it.

In the present disclosure, the protective inner shell 2 and the protective outer shell 1 are shaped in a hollow hood structure. This design allows the protective outer shell 1 and protective inner shell 2 to provide protection without obstructing the airflow from the fan blades 8, preventing users from being injured by the rotating fan blades 8.

In the present disclosure, the position of the switch 6 corresponds to the position of the control board 5. This corresponding positioning reduces the amount of wiring required between the control board 5 and the switch 6.

In the present disclosure, the bottom of the base 3 is provided with a non-slip pad 12. The non-slip pad 12 is fixedly connected to the bottom of the base 3. This non-slip pad 12 increases the friction between the base 3 and the ground, making the operation of the fan more stable.

By connecting all electrical components in this case to their corresponding power sources via wires, one should select an appropriate controller based on actual needs to meet control requirements. The specific connections and control sequence should be completed by referring to the operational principles described below, detailing the sequential operation of each electrical component. The specific connection methods are well-known techniques in the field, and the following mainly introduces the operational principles and processes without further explanation of electrical control.

In this embodiment: When using the fan, the support plate 9 under the base 3 is pulled outward. As the support plate 9 is pulled outward, the clamping block 11 inside the support plate 9 moves inward. When the support plate 9 is pulled to a certain distance, the spring 10 pushes the clamping block 11 into contact with a groove on the base 3, slightly limiting the support plate 9 to prevent it from sliding freely. This increases the contact area of the fan with the ground, making it more stable. To turn on the fan, press the switch 6 at the center of the back of the device shell 4. The switch 6 controls the operation of the power motor 7 via the control board 5. The power motor 7 drives the fan blades 8 to rotate, and the wind generated by the rotation of the fan blades 8 located between the protective outer shell 1 and the protective inner shell 2 blows through the hollow structure of the protective outer shell 1 and the protective inner shell 2 towards the user. The non-slip pad 12 under the base 3 increases the friction between the base 3 and the ground, making the fan's operation more stable. The protective outer shell 1 and the protective inner shell 2 protect the user, preventing injury from accidental contact with the rotating fan blades 8. After use, press the switch 6 at the back of the device shell 4 to turn off the power motor 7. The power motor 7 stops, causing the fan blades 8 to cease rotation. At this point, rotate the base 3 towards the device shell 4 until the base 3 is parallel to the device shell 4. Then push the support plate 9 inward to reset it, completing the storage of the fan.

It should be noted that relational terms such as first and second are used solely to distinguish one entity or operation from another, and do not necessarily require or imply any actual relationship or order between such entities or operations. Furthermore, terms such as "include," "comprise," or any other variations are intended to cover non-exclusive inclusion, such that a process, method, item, or device that includes a list of elements not only includes those elements but also other elements not expressly listed or inherent to such process, method, item, or device. Without further limitations, a statement "including one element . . . " does not exclude the presence of additional identical elements in the process, method, item, or device that includes the element.

Although the embodiments of the present disclosure have been shown and described, it will be understood by those skilled in the art that various changes, modifications, substitutions, and alterations can be made without departing from the principles and spirit of the present disclosure. The scope of the present disclosure is defined by the appended claims and their equivalents.

What is claimed is:
1. A fan convenient for storage, comprising:
a protective outer shell,
a protective inner shell, wherein the protective outer shell is embedded on an inner side of the front of the protective inner shell;
a base, wherein the base is located below the protective inner shell and is directly connected to the bottom of the protective inner shell in a rotatable manner;
a device shell, wherein the device shell is located at the back of the protective inner shell and is detachably connected to the protective inner shell;

a control board, wherein the control board is located at a central position inside the device shell and is fixedly connected to the device shell;

a switch, wherein the switch is located at the central position on the back of the device shell and is electrically connected to the control board;

a power motor, wherein the power motor is located inside the protective inner shell and is fixedly connected to the protective inner shell, the power motor is electrically connected to the control board; and fan blades, wherein the fan blades are located inside the protective inner shell and are fixedly connected to an output end of the power motor;

wherein the base is provided with a support plate, the support plate is slidably connected to the base, the support plate is provided with a spring and a clamping block, the spring is located inside the support plate and is fixedly connected to the support plate, the clamping block is located inside the support plate and is slidably connected to the support plate, and the clamping block is fixedly connected to the spring; when using the fan, the support plate under the base is pulled outward, and the clamping block inside the support plate moves inward to enable the support plate to extend outward, the spring pushes the clamping block into contact with a groove on the base to limit an extending distance of the support plate.

2. The fan convenient for storage according to claim 1, wherein the protective inner shell and the protective outer shell are in the shape of a hollow hood structure.

3. The fan convenient for storage according to claim 1, wherein a position of the switch corresponds to a position of the control board.

4. The fan convenient for storage according to claim 1, wherein the bottom of the base is provided with a non-slip pad, which is fixedly connected to the bottom of the base.

* * * * *